USO09747280B1

(12) United States Patent
Smyros et al.

(10) Patent No.: US 9,747,280 B1
(45) Date of Patent: Aug. 29, 2017

(54) DATE AND TIME PROCESSING

(71) Applicant: Intelligent Language, LLC, Richardson, TX (US)

(72) Inventors: Athena Ann Smyros, Richardson, TX (US); Constantine John Smyros, Richardson, TX (US)

(73) Assignee: Intelligent Language, LLC, Richardson, TX (US)

( * ) Notice: Subject to any disclaimer, the term of this patent is extended or adjusted under 35 U.S.C. 154(b) by 0 days.

(21) Appl. No.: 14/465,075

(22) Filed: Aug. 21, 2014

Related U.S. Application Data

(60) Provisional application No. 61/868,092, filed on Aug. 21, 2013.

(51) Int. Cl.
*G06F 17/27* (2006.01)
*G06F 17/28* (2006.01)

(52) U.S. Cl.
CPC .................... *G06F 17/28* (2013.01)

(58) Field of Classification Search
CPC .................................................. G06F 9/4448
USPC ............................................................ 704/9
See application file for complete search history.

(56) References Cited

U.S. PATENT DOCUMENTS

| 4,965,763 | A | * | 10/1990 | Zamora | G06F 17/3061 704/1 |
| 5,682,539 | A | * | 10/1997 | Conrad | G06F 17/28 704/9 |
| 5,878,386 | A | * | 3/1999 | Coughlin | G06F 17/2705 704/10 |
| 6,076,088 | A | * | 6/2000 | Paik | G06F 17/30707 |
| 6,275,791 | B1 | * | 8/2001 | Weise | G06F 17/2705 704/9 |
| 6,631,346 | B1 | * | 10/2003 | Karaorman et al. | 704/9 |
| 6,745,161 | B1 | * | 6/2004 | Arnold et al. | 704/7 |
| 7,028,259 | B1 | * | 4/2006 | Jacobson | 715/236 |
| 7,080,004 | B2 | * | 7/2006 | Wang et al. | 704/9 |
| 7,171,349 | B1 | * | 1/2007 | Wakefield | G06F 17/30619 704/9 |
| 7,844,594 | B1 | * | 11/2010 | Holt | G06F 17/30719 707/706 |
| 7,860,872 | B2 | * | 12/2010 | Serjeantson et al. | 707/755 |
| 8,051,088 | B1 | * | 11/2011 | Tibbetts et al. | 707/749 |
| 8,594,996 | B2 | * | 11/2013 | Liang | G06F 17/21 704/10 |
| 8,775,341 | B1 | * | 7/2014 | Commons | G06N 3/0454 706/20 |
| 8,788,263 | B1 | * | 7/2014 | Richfield | 704/9 |
| 8,880,390 | B2 | * | 11/2014 | Ceylan | G06F 17/2235 704/1 |
| 9,304,974 | B1 | * | 4/2016 | Tomkins | G06F 17/2765 |
| 2003/0191625 | A1 | * | 10/2003 | Gorin | G06F 17/278 704/1 |
| 2005/0108630 | A1 | * | 5/2005 | Wasson | G06F 17/241 715/230 |

(Continued)

*Primary Examiner* — Fariba Sirjani
(74) *Attorney, Agent, or Firm* — Slater Matsil, LLP

(57) ABSTRACT

For language elements that indicate or suggest time, such as adverbs, these also contain date and time information that can be used to quantify time for a single piece of text or for an entire repository. This quantification of time can then be used by many applications, such as a mobile device that needs to know when to execute a command or when an investigator is trying to piece together a chain of events from different documents.

15 Claims, 2 Drawing Sheets

(56) References Cited

U.S. PATENT DOCUMENTS

| | | | |
|---|---|---|---|
| 2006/0047691 A1* | 3/2006 | Humphreys | G06F 17/278 |
| 2006/0053000 A1* | 3/2006 | Moldovan et al. | 704/9 |
| 2006/0271353 A1* | 11/2006 | Berkan et al. | 704/9 |
| 2007/0156669 A1* | 7/2007 | Marchisio | G06F 17/30731 |
| 2007/0233465 A1* | 10/2007 | Sato et al. | 704/10 |
| 2008/0140384 A1* | 6/2008 | Landau | 704/9 |
| 2008/0270119 A1* | 10/2008 | Suzuki | 704/9 |
| 2009/0024385 A1* | 1/2009 | Hirsch | G06F 17/2785 704/9 |
| 2009/0254337 A1* | 10/2009 | Sprecher et al. | 704/9 |
| 2009/0300043 A1* | 12/2009 | MacLennan | 707/102 |
| 2009/0326926 A1* | 12/2009 | Landau | G06F 17/30548 704/9 |
| 2010/0042588 A1* | 2/2010 | Smyros et al. | 707/3 |
| 2010/0042589 A1* | 2/2010 | Smyros et al. | 707/3 |
| 2010/0042590 A1* | 2/2010 | Smyros et al. | 707/3 |
| 2010/0042602 A1* | 2/2010 | Smyros et al. | 707/4 |
| 2010/0042603 A1* | 2/2010 | Smyros et al. | 707/4 |
| 2010/0128042 A1* | 5/2010 | Confrey | G06T 11/60 345/473 |
| 2011/0202333 A1* | 8/2011 | Abir | 704/4 |
| 2011/0238410 A1* | 9/2011 | Larcheveque et al. | 704/9 |
| 2011/0264646 A1* | 10/2011 | Sokolan | G06F 17/30616 707/711 |
| 2012/0109637 A1* | 5/2012 | Merugu et al. | 704/9 |
| 2012/0265519 A1* | 10/2012 | Latendresse | G06F 17/278 704/9 |
| 2013/0238316 A1* | 9/2013 | Shastri | G06F 17/2765 704/9 |
| 2013/0311166 A1* | 11/2013 | Yanpolsky | 704/2 |
| 2014/0006082 A1* | 1/2014 | Harms | G06Q 10/1095 705/7.19 |
| 2014/0067379 A1* | 3/2014 | Kim | G06F 17/271 704/9 |
| 2014/0229158 A1* | 8/2014 | Zweig et al. | 704/9 |
| 2014/0278351 A1* | 9/2014 | Clark et al. | 704/9 |
| 2014/0278352 A1* | 9/2014 | Clark et al. | 704/9 |
| 2014/0278448 A1* | 9/2014 | Sadeghi | G06Q 50/22 705/2 |
| 2014/0297261 A1* | 10/2014 | Sayers et al. | 704/9 |
| 2014/0372102 A1* | 12/2014 | Hagege et al. | 704/9 |

\* cited by examiner

DATE AND TIME PROCESSING

RELATED APPLICATIONS

This application claims priority from Provisional Application No. 61/868,092, "DATE AND TIME MANAGEMENT", filed 21 Aug. 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION OF THE INVENTION

Date and time are measurements in a set of related units. For uses in a search or information engine, they are required to be discernable from the text. In other cases, they can inform the sequence of objects, events, or operations within a body of text. For whatever the purpose, date and time are measurements that can be expressed in a set of related units with a specific hierarchy. Depending on how specific the unit of measurement is, it may need to be related to other measurements in order to arrive at its specific value or set of values. For language elements that indicate or suggest time, such as adverbs, these also contain date and time information that can be used to quantify time for a single piece of text or for an entire repository. This quantification of time can then be used by many applications, such as a mobile device that needs to know when to execute a command or when an investigator is trying to piece together a chain of events from different documents.

Note that date/time information can be considered as a subset or type of topic. For more information on topics see "SYSTEMS and METHODS OF TOPICAL ANALYSIS", filed on 29 Nov. 20128, Ser. No. 13/689,656, which is incorporated herein by reference in its entirety, and "SYSTEMS AND METHODS FOR TOPICAL SEARCHING", U.S. application Ser. No. 12/192,846, filed 15 Aug. 2008, and published as Application No: 2010/0042589 on 18 Feb. 2010, the disclosure of which is hereby incorporated herein by reference in its entirety.

Figure 1:
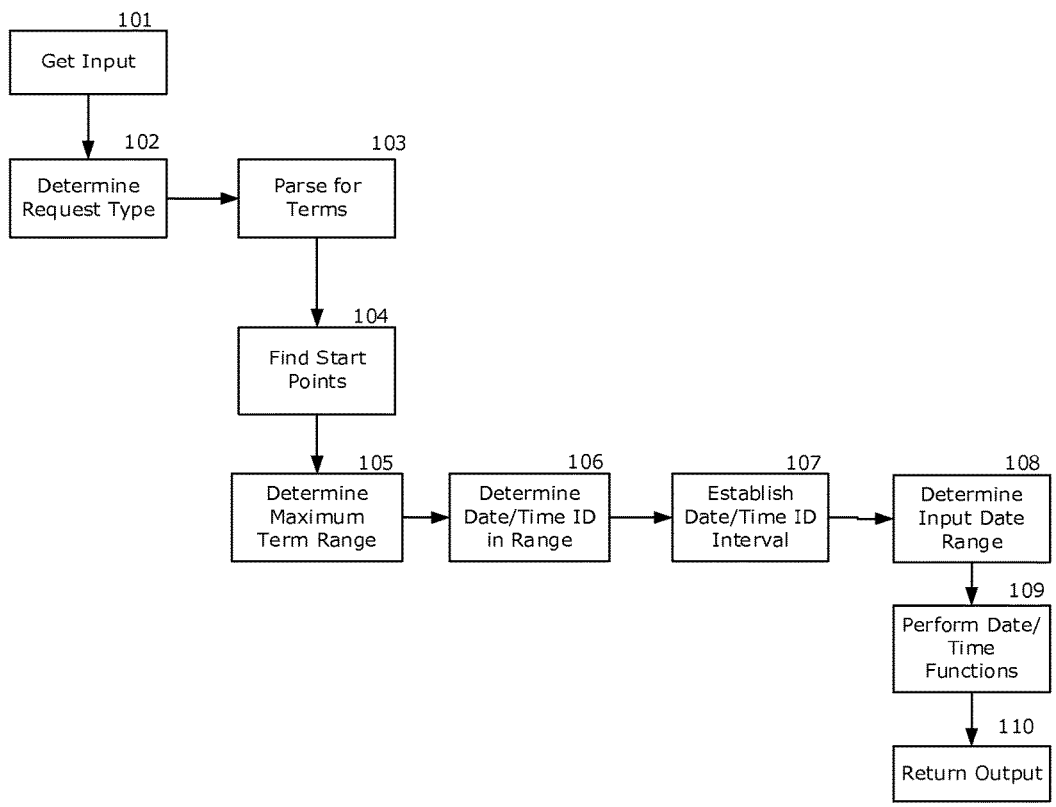
FIG. 1 illustrates a Flowchart of the Date/Time Process that is usable with the embodiments described herein.

FIG. 1 demonstrates how date/time analysis can be performed using the current system. Users or another system or device can supply input 101 in the form of a message, file, document, or any other text stream in a supported language for a given implementation, such as English. The input may also contain other information, such as a request type, to indicate the type of date/time processing that is required. Other input forms of communication, such as speech, etc., that is converted to text can be used. The input can be from the same system or a calling system using any device. There is no restriction on the type of information that can be sent; even if there is no date/time explicitly mentioned, other methods of date/time analysis can be used on the input. The present invention is designed to assign any date/time information that is available within the input or about the input that can extracted.

Next, an optional Determine Request Type 102 is performed. A request type determines the amount of date/time analysis that is required by the input; examples include: only analyze for all dates, sequence all dates of objects, establish the time the document was written, the time referred to by the information in a message, and other such information that can be used by the input. Some implementations may require all forms of analysis; some may only require one. A request type is based on the availability of the information in the currently-implemented system. In some cases, the implementation will not support object sequences if it does not have the ability to recognize an object. If object information is available, a specific object can also be used as part of the request if needed by an implementation.

Parsing the terms 103 is performed to take the string from a set of characters to a set of terms used within the language, as well as mapping the function they perform, such as a noun, verb, etc., within that language. A method for this is shown in U.S. application Ser. No. 13/402,775, entitled "SYSTEMS AND METHODS UTILIZING A SEARCH ENGINE", filed 22 Feb. 2012, since issued as U.S. Pat. No. 8,918,386, the disclosure of which is hereby incorporated herein by reference in its entirety. For some types of analysis, such as those that require precise measurements, the function within the language is not necessary; for other types, the function within the language is essential to restrict the number of terms that must be examined, making the process more efficient as well as accurate. A precise measurement is an exact date, such as "12/12/12", whereas a general term, such as "yearly", is considered imprecise as it doesn't refer to a specific time on its own. The parsing should be lossless; it should not leave out any punctuation or other marks that for many language renderings of date/time measurements are essential for understanding the measurement. A term matrix can be used to store this data, keeping the order in which the dates were presented in the input.

Once the parsing has been completed, then the term matrix is used as the basis for locating start points 104. A start point indicates the set of identifiers that comprise the set of date/time measurement indicators. There is not sufficient information to know at this stage that they are dates and/or times. Start points are related to the number of expressions for the dates and/or times required by a particular implementation. For instance, when the days of the week are used to indicate dates, they can start with a set of known characters, as in English, for example: {M, T, W, F, S}, e.g., indicating Monday, Tuesday, Wednesday, Friday, and Sunday, respectively. Dates have specific patterns and their order can be changed, even within the same language, as in "January 2, 2012, which is equivalent to 2nd of January, 2012". A list of known characters that are start dates comprise the days, weeks, and months, and can be equal to, for example,: {J, F, M, A, S, O, N, D, T, W}, e.g., indicating January, Friday, May, August, Saturday, October, November, December, Thursday, and Wednesday, respectively. When a date contains a quantity, like a year, then the start point is a digit, from 0-9. Many dates and times contain a splitter indicator, or some character or set of characters that indicate a separation between quantities, such as "1/2/12", where the "/" is considered the splitter. A time example would be equal to "4:30", where the ":" is considered the splitter indicator. These may be added to the list of known characters that comprise dates and times that contain numbers.

There are variations to this even within the same language, such as American date ordering and English date ordering. In the American system the 1/2/12 would be interpreted as January 2, 2012, whereas in the English system this would be interpreted as February 1, 2012. In the current state of the art this is referred to as a locale problem, but this is imprecise based on the fact that documents can be generated using the same software without any locale being indicated by an operating system indicator or a software indicator. A word processor can be used without any special settings. This relies then on language usage to indicate the date order being used, such as use of English spellings versus American spellings or the use of certain prepositional inflections such as "whilst" instead of "while". Another method may involve determining the location of what is being said in the document, by using placenames etc., to determine how the document's time representations are being made.

However, some date or time quantities are expressed as simple numbers or integers, such as "2000". Then, the digit must remain a start point in order to locate these within a parsed input. However, more information can be used to determine if this is a date/time quantity, and that is the knowledge of what function they perform in the input, such as "in the year 2000". In this case, the term "year" indicates a date quantity identity and therefore would be related to the number that is the object of that phrase. Identities also have a set of known characters, and these can be a part of the list of known characters that comprise dates and times. They are checked within the grammar function such that modifiers of objects and phrases of objects can be used to group the known date and time indicators within a specific language.

The use of grammar and the size of the input itself can be used to determine the maximum term range 105. This determines the number of possible terms that contain a unique date or time. For instance, the message "I will be available Wednesday, the 21$^{st}$ of March", requires that the grammar is available to determine the relation between Wednesday and the following phrase in order to be able to assign it as a term range. It is assigned as a maximum term range because there is only one modifier set after the object Wednesday. In other cases, once a specific date/time indicator is found, then the entire term is considered a part of the term range. If the input is "I will be available 1/2/03 from 4:30-6:30", then the maximum date range is indicated by first the grammar relation of a modifier to another modifier (1/2/03 and from 4:30-6:30), because each term in the phrase contained a known date/time splitter, the colon (:). In other cases, adverbs such as "today", "currently," and other such terms can be enumerated and the starting character can be used as part of the list of known characters for a given language as well.

Once the maximum range has been identified, then the task of determining whether each term in the range represents a date and/or time, its ID, is performed 106. Each date and time indicator in a given language has a known set of expressions and/or expression elements. An expression is comprised of elements, and an element is considered to be recognizable within the language. Using the example "03/06/2003", there is a single expression with three elements that comprise the expression, along with two splitters, the forward slash (/). Moreover, there are acceptable orders so that each element, when it is not distinguishable from another element with respect to form, such as the above example in this paragraph, can be matched to a specific set of values. Using English, there are two possible orders: either the month is first or the day is first. So long as the day or month can equal 03 and the day or month can equal 06, this is considered a legitimate date. For some implementations, the author's location (such as United States) or the location of the content (such as Australia) may be required to determine if the day is listed first or the month is listed first within this pattern. In other cases, other information within the parsed input may also be required that indicates which is which, such as a spelled-out month, such as "March". An example of such an input is "Each employee will have until 03/06/2003 to decide. An extension to the end of March might be possible".

Other date/time expressions are based on the function served in the input. The example: "daily until 5 pm" requires that "daily" is a known expression of time and functions as an adverb, and that 5 pm is an expression made up of 2 parts: the hour digit (5) and the before or after noon indicator (pm). In some cases, the form of the term is indicated by its function in the input, and only that information is necessary to determine the possible date or time. For instance, English verbs are conjugated based on tense, and they can be used, along with other data within the maximum term range, to indicate a date/time. In the message: "Diane missed the sale", the maximum date range equals "missed" because it is functioning as a verb. In addition, the past tense can be quantified as before the system time or the time that the message was generated. This is an example of an imprecise indication of a date or time.

Depending on the input, some imprecise measures may be all that is available that indicates date/time information. These will still need a date/time ID. For instance, a message may contain the phrase "early this year". This on its own would not be able to map to a specific timeline without using information from the file system, such as when the message was generated. This may also be impacted by the consideration of the initial message versus any modifications, which may be done at different times and therefore contain an error function. If all the modifications as well as the creation of the file occur within the time frame of the comparison, there is no error. Any variation would cause a likely error, since the time frame may not be consistent within the modifications of a given input. Depending on the type of object, the amount of information that will be in the date/time ID will need to have enough date/time data to support comparisons with more precise dates, such as a comparison between "1/3/2002" and "January 2002" and "early this year" plus-file information stating the file was created and last modified in 2002.

The output of 106 is the listing of all the date/time IDs and their corresponding indicators against a hierarchy, when imprecise dates are used as well as being able to determine the order of days and months and other date and time indicators not expressed as simple numbers. For instance, the month and day indicators are bounded by the calendar being used for a specific language. In English, the months go up to 12 and the days to 31. However, knowing what day it is at is only one part of the hierarchy; there is an ordering principle independent of expression order. For instance, it is necessary to know the week to understand that the day Wednesday can occur before a Monday when the Monday is the start of a new week. Therefore, these can be ordered into a hierarchy so that this ordering can be accomplished. A sample ordering is as follows, from most significant to least significant: century, year, month, week, day. While each date expression may not contain all this information directly, a partial ordering allows the change in the week to override the fact that Monday appears before Wednesday within the week boundary. This information can be used to order different date and time expressions within the final term range after all such IDs are known.

Once all the IDs have been established, then their interval can be optionally determined 107. An interval indicates what parts of the input are covered by the date and time expressions that were found. These are measured in the number of terms, which can be converted to a position integer within the document. Each date/time expression may have an interval associated with it. It may be attached to an object, to a verb, or to another part of the sentence. The interval may be closed; in other words, another date/time ID is present. The interval may also be open; there is no other date/time ID present. There are gradations to this: some date/time IDs may be referring to different elements of the same date, such as an input: "The offer ended in 2011. I think it was in November.". In this case, the year was stated, then the month was mentioned. These are two different date indicators, but the interval represented by 2011 is not impacted by the other date indicator November. Therefore, the year 2011 is an open interval with respect to the text in the input. The calculation of the interval may also involve the notions of overlap and containment. Overlap indicates that two intervals have some terms in common and containment indicates that one term's interval is completely contained within another term's interval. Each date and/or time ID can be related to each other in this manner, forming a hierarchy. Several uses for date or time hierarchies exist; for instance, if user requests of an information or search engine: "What sales are on this Saturday in Destin", the repository that contains the date/time hierarchy would be able to accurately locate such sales by being able to locate all stores that were having sales, and what merchandise would be on sale Saturday, as opposed to merchandise that went on sale Sunday.

After the date/time IDs and intervals are established, the optional Determine Input Date Range 108 can be performed. The date range of an input is the earliest and latest date or time IDs that are found within an input. This requires that all such dates and/or time IDs can be sequenced such that an ordering can be performed. This includes both the numeric dates with relations to a hierarchy, as well as grammar-based indicators such as verb tense, such that the total range of the input with respect to dates and times can be calculated. In the example above "Each employee will have until 03/06/2003 to decide. An extension to the end of March might be possible.", the date IDs range from the date of the input creation to the end of March. This is the date range expressed by this input. In other inputs, several different date or time ranges might be expressed. A sale page from a grocery store could have sales for goods that last until Saturday, others that last until Tuesday, etc. The total range of the sales dates would include all the sales for that circular until the last date ID, Tuesday, regardless of where the Tuesday appeared in the input. Therefore, this is an independent measure that looks at the total range of the dates. This can be extended to a collection of inputs and to an entire repository, as necessary for a given implementation. Each input can be thought of as a document, file, or message, and may be stored in a repository for future use. The times for each repository member for instance can then be compared against each other to determine the total time range for that repository. For instance, an information engine may return only those documents that match a given time range represented by the information in the document, such as when a search for a sale is being performed. The date or time of the document's creation or entry into the repository is not as significant.

In some cases, the output can form the basis for other calculations involving dates 109, such as determining the range of possible dates an event occurred, or the duration of an event where the endpoints are known. For instance, it may be possible to take each date/time ID as an endpoint, regardless of the form of the expression of the ID, and convert it into a form suitable for calculations. If the first date/time ID is 5/09, which is the first endpoint of the document, and the second endpoint is January 2011, the date/time ID would be able to perform operations these by solving for the individual intervals as indicated (such as the month and year), and then converting these into a numerical form in order to determine the interval between the two endpoints. There are two units of time represented, the month and the year based on the ID. Then, the range of possible values for the month and year are determined. Lastly, the later time is determined and subtracted from the earlier time to determine the range as indicated by the two endpoints. In this example, the subtraction would be from 2011-2009 for the year unit, leaving the difference of 2. This is multiplied by the subunit, month, to get 24. The subunit is determined from the year ranges in common (May 2009-2011), and adding or subtracting the difference; in this case, the 05 (May) is subtracted from January (01), to get 4. This is subtracted from the range to get the total number of months, which is 20. This can be expressed also in terms of both main units and subunits: 1 year, 8 months.

Depending on the type of request being made, the output is delivered 110. The output may be of any form. In some cases, a simple text return indicating the date or times found may be sufficient. In other cases, the hierarchy for a given input showing the relations between different times may be required, illustrating what sections of the input, such as the objects when grammar is used to parse the input, is related to what date/time ID. Yet other requests may be aimed at the input itself, determining the range in which it operates. The return may be text, numeric, visual, or any other type of illustration that indicates relations between two integers or sets of integers.

Date and time processing that employs grammar to handle both precise and imprecise time information allow mobile users as well as mobile web page developers to express time without having to conform to a strict time format, such as a regular expression. For instance, a use of the system is when a document has been formatted about the times that an auction house is going to hold a particular auction. The date and time can be expressed in a variety of forms using standard English without having to structure the data, also making it useful for human based messaging. For instance, if a web page says "we are open daily between 9 am and 5 pm not including weekends", the system would first locate all the possible date/time indicators: "daily", "9 am and 5 pm", and "weekends". With the grammatical analysis, daily would subtract weekend (because of the not condition on weekend), leaving the days open interval equal to Monday through Friday. The use of the binary "and" and the use of the preposition "between" indicates a range, so time interval is from 9 am to 5 pm. The system does not require the dates or the time to be in a regular expression in order to be able to map the time to a timeline for each specific day they are open.

Figure 2:
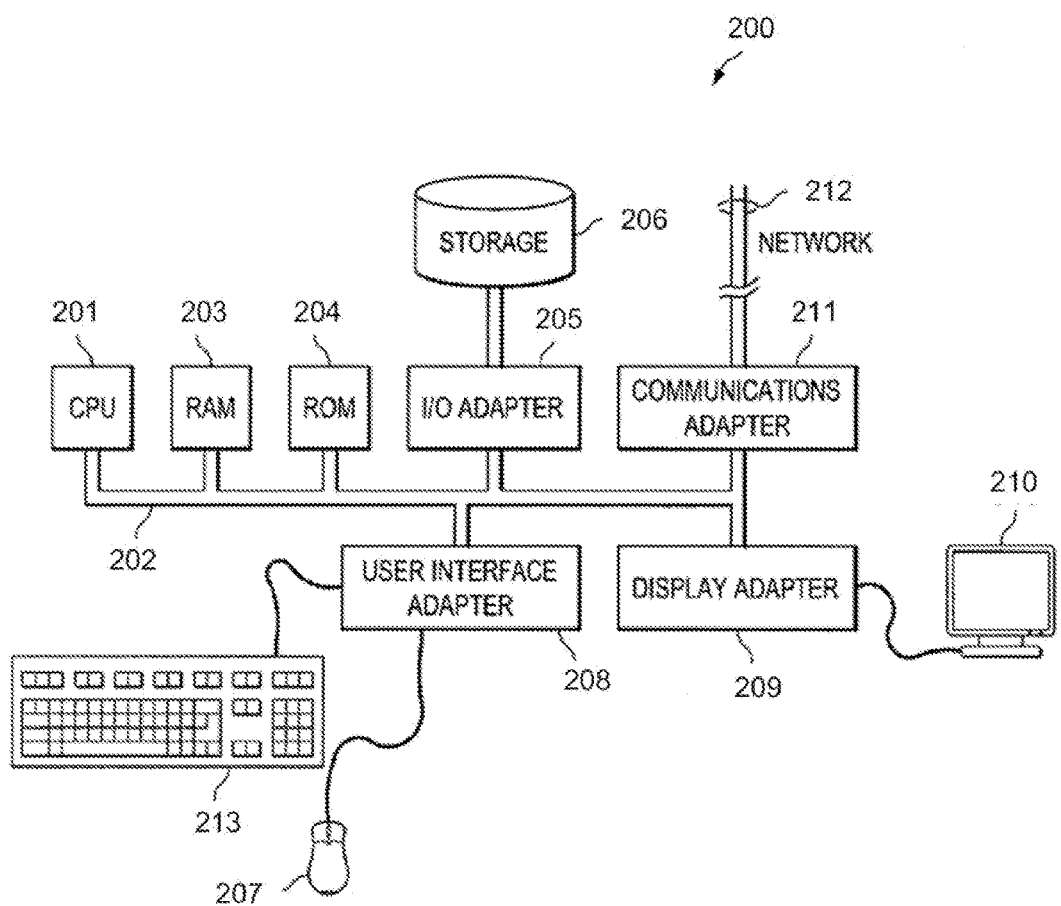
FIG. 2 illustrates a computer system that is usable with the embodiments described herein.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller 205, communications adapter 211, user interface 208, and display 209. The I/O adapter card 205 connects to storage devices 206, such as one or more of flash memory, a hard drive, a CD drive, a floppy disk drive, a tape drive, to the computer system. Communications 211 is adapted to couple the computer system 200 to a network 212, which may be one or more of a telephone network, a local (LAN) and/or a wide-area (WAN) network, an Ethernet network, and/or the Internet network. User interface 208 couples user input devices, such as keyboard 213, pointing device 207, to the computer system 200. The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

What is claimed is:

1. A computing device comprising:
   one or more processors; and
   a non-transitory, computer-readable medium storing programming executable by the one or more processors, the programming comprising instructions to:
   receive an input corresponding to a plurality of documents;
   receive a request type, the request type indicating a type of date/time analysis to be performed on the input;
   determine an amount of date/time analysis associated with the request type, wherein the amount of date/time analysis comprises at least one of analysis of all dates of the objects in the input, sequencing all dates of objects in the input, establishing all times of authorship of objects in the input, or identification of all times embodied in the input; and
   perform date/time analysis of the input by:
   forming a terms unit matrix from the input, the term unit matrix comprising a plurality of term units, wherein at least one of the plurality of term units comprises a linguistic word, and the term unit matrix in a lossless representation of the input;
   determining a grammatical function for each term of the plurality of term units;
   determining location of first mention for at least one term of the plurality of term units;
   determining, using grammatical rules, a first portion of the term unit matrix associated with the first mention, wherein the first portion of the term unit matrix includes other terms of the plurality of term units associated with the at least one term, wherein the first range indicates other terms of the plurality of terms associated with the at least one term;
   determining a date/time object associated with the at least one term and the first portion of the term unit matrix;
   mapping the date/time object to a date/time ID, the date/time ID different than the date/time object, wherein the date/time ID is a date and time indicator, wherein the date/time ID operates only as a date/time indication, and wherein the date/time ID comprises a first letter of a day of the week and a month of the year;
   determining a second portion of the term unit matrix associated with the date/time ID;
   determining an interval of the date/time ID, wherein the interval is a third portion of the input with which the date/time ID is associated; and
   providing an output based on the date/time ID using the second portion of the term unit matrix and the third portion of the input.

2. The computing device of claim 1, wherein the output comprises results for a search of a database for information associated with the date/time ID.

3. The computing device of claim 1, wherein the date/time ID further comprises a numerical value indicative of a date/time.

4. The computing device of claim 1, wherein the programming further comprises instructions to produce a hierarchical representation of plural date/time object IDs.

5. The computing device of claim 1, wherein the programming further comprises instructions to determine a date range for the input, wherein the date range comprises an earliest date/time object and a latest date/time object located within the input.

6. The computing device of claim 1, wherein the computing device comprises at least one of: a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (POS) device, a digital assistant, a desk phone, an Internet protocol (IP) phone, a solid-state memory device, a tablet, or a memory card.

7. A method comprising:
  receiving an input and a request type, the request type indicating a type of date/time analysis to be performed;
  determining an amount of date/time analysis associated with the request type, wherein the amount of date/time analysis comprises at least one of analysis of all dates of objects in the input, sequencing all dates of objects in the input, establishing all times of authorship of objects in the input, or identification of all times embodied in message of the input;
  parsing a plurality of terms of the input into a set of terms, wherein parsing forms a lossless representation of the input;
  determining a grammatical function for each term of the set of terms;
  locating a start point for at least one term of the set of terms;
  determining a first range for the at least one term using the start point and grammatical rules, wherein the first range indicates other terms of the plurality of terms associated with the at least one term;
  determining a date/time object associated with the at least one term and the first range;
  mapping the date/time object to a date/time ID, the date/time ID different than the date/time object, wherein the date/time ID is a date and time indicator, wherein the date/time ID operates only as a date/time indication, and wherein the date/time ID comprises a first letter of a day of the week and a month of the year;
  determining a second range of the date/time ID;
  determining an interval of the date/time ID, wherein the interval comprises a portion of the input with which the date/time ID is associated; and
  providing an output based on the date/time ID using the second range and the interval.

8. The method of claim 7, wherein the output comprises results for a search of a database for information associated with the date/time ID.

9. The method of claim 7, wherein the date/time ID further comprises a numerical value indicative of a date/time.

10. The method of claim 7, further comprising: producing, by the computing device, a hierarchical representation of plural date/time object IDs.

11. The method of claim 7, further comprising: determining, by the computing device, a date range for the input, wherein the date range comprises an earliest date/time object and a latest date/time object located within the input.

12. The method of claim 7, wherein the computing device comprises at least one of: a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (POS) device, a digital assistant, a desk phone, an Internet protocol (IP) phone, a solid-state memory device, a tablet, or a memory card.

13. A method comprising:
  receiving, by a computing device, an input text stream and a request type, the request type indicating a type of date/time processing;
  determining, by the computing device, an amount of date/time analysis associated with the request type for the input text stream, wherein the amount of date/time analysis comprises analysis of dates of objects in the input text stream, sequencing dates of objects in the input text stream, establishing times of authorship of objects in the input text steam, or identification of times embodied in messages of the input text stream; and
  performing, by the computing device, date/time analysis of the input text stream by:
  parsing a plurality of terms of the input text stream into a set of terms, wherein the parsing is substantially lossless;
  determining a grammatical function for each term of the set of terms;
  locating a start point for at least one term of the set of terms;
  determining a term range for the at least one term using the start point and grammatical rules, wherein the term range spans other terms of the plurality of terms associated with the at least one term in the set of terms;
  determining a date/time object associated with the at least one term and the term range;
  mapping the date/time object to a date/time ID, the date/time ID distinct from the date/time object, wherein the date/time ID is a date and time indicator, wherein the date/time ID operates only as a date/time indication, and wherein the date/time ID comprises a first letter of a day of the week and a month of the year;
  determining a date/time range of the date/time ID, the date/time range within the term range;
  determining an interval of the date/time ID, wherein the interval is a portion of the input text stream with which the date/time ID is associated; and
  providing an output based on the date/time ID using the date/time range and the interval, the output comprising a hierarchical representation of plural date/time object IDs.

14. The method of claim 13, wherein the programming further comprises instructions to determine a date range for the input, wherein the date range comprises an earliest date/time object and a latest date/time object located within the input.

15. The method of claim 14, wherein the computing device comprises at least one of: a computer, a laptop computer, a personal computer, a personal data assistant, a camera, a phone, a cell phone, a mobile phone, a computer server, a media server, a music player, a game box, a smart phone, a data storage device, a measuring device, a handheld scanner, a scanning device, a barcode reader, a point-of-sale (POS) device, a digital assistant, a desk phone, an Internet protocol (IP) phone, a solid-state memory device, a tablet, or a memory card.

* * * * *